(12) United States Patent
Espeseth et al.

(10) Patent No.: US 7,334,081 B2
(45) Date of Patent: Feb. 19, 2008

(54) SYSTEM AND METHOD FOR OPTIMIZING SEQUENTIAL XOR COMMAND PERFORMANCE

(75) Inventors: Adam Michael Espeseth, Rochester, MN (US); Edward Henry Younk, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 321 days.

(21) Appl. No.: 11/117,972

(22) Filed: Apr. 29, 2005

(65) Prior Publication Data

US 2006/0245106 A1 Nov. 2, 2006

(51) Int. Cl.
*G06F 12/00* (2006.01)
(52) U.S. Cl. .................... 711/112; 711/169; 710/35
(58) Field of Classification Search .............. None
See application file for complete search history.

(56) References Cited

U.S. PATENT DOCUMENTS

| | | | |
|---|---|---|---|
| 5,193,036 A | 3/1993 | Green et al. | 360/78.14 |
| 5,742,752 A * | 4/1998 | DeKoning | 714/6 |
| 6,493,171 B2 | 12/2002 | Enokida et al. | 360/75 |
| 6,725,327 B1 | 4/2004 | Espeseth et al. | 711/112 |
| 6,728,054 B2 * | 4/2004 | Chng et al. | 360/63 |
| 6,845,405 B1 * | 1/2005 | Thelin | 710/6 |
| 2003/0202270 A1* | 10/2003 | Ng et al. | 360/51 |

OTHER PUBLICATIONS

Popovici, et al., "Robust, Portable I/O Scheduling with the Disk Mimic", Proceeding of the UNSNIX 2003 Annual Technical Conference, Jun. 9-14, 2003, pp. 1-14.
Kotz, et al., "A Detailed Simulation Model of the HP 97560 Disk Drive", Department of Computer Science Dartmouth College, Darmouth PCS-TR94-220, Jul. 18, 1994, pp. 1-13.
Rob Elliott, "Bidirectional XDWRITEREAD commands for SBC-2", email to T10 Technical Committee, Sep. 28, 2000, pp. 1-5.

* cited by examiner

*Primary Examiner*—Jasmine Song
(74) *Attorney, Agent, or Firm*—John L. Rogitz

(57) ABSTRACT

An RPO algorithm in a HDD coalesces LBA-sequential XOR commands in pipes, and passes the pipes to a lower level execution engine. The execution engine executes XOR reads and write separately to optimize performance using head and/or cylinder skew information to approach the nominal disk data rate.

13 Claims, 2 Drawing Sheets

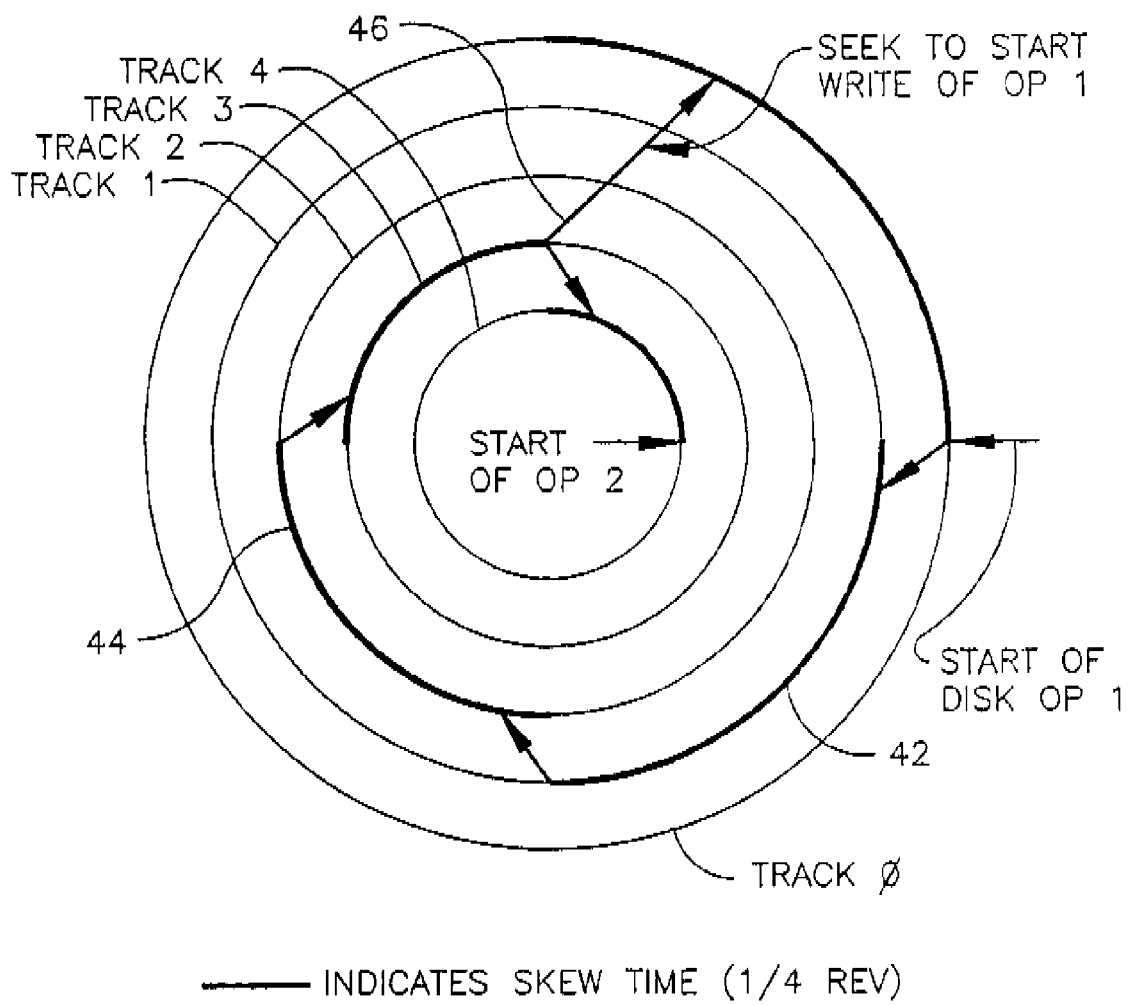

SYSTEM AND METHOD FOR OPTIMIZING SEQUENTIAL XOR COMMAND PERFORMANCE

FIELD OF THE INVENTION

The present invention relates to hard disk drives.

BACKGROUND OF THE INVENTION

When a hard disk drive (HDD) has more than one command to execute, the commands are placed in a queue from which the next command is chosen. A Rotational Position Optimization (RPO) algorithm is used to reorder the commands for execution. Presently, hard disk drives use a Shortest Access Time First (SATF) RPO algorithm to determine which command to select. This algorithm works as follows: given a set of commands in a queue, choose the command that can be started (accessed) first. This calculation has two parts, namely, the time to perform the seek and settle operation from the current cylinder to the target cylinder, and the latency (also referred to as "extra time" herein) between this point and the starting sector for the command. Together these parts make up the estimated access time (EAT) for each queued command. The SATF algorithm depends on accurate estimates of the access time. If the estimate is too low, the actuator may settle on track after the desired sector has passed rotationally resulting in a 'miss' which adds one full revolution to the access time and, thus, degrading performance. On the other hand, if the estimate is too high, the optimal command candidate is not chosen for execution.

In any case, a SATF RPO algorithm simply selects the command which can be started first. A Delta Expected Access Time (DEAT) RPO algorithm has been proposed as an improved SATF by choosing the command that has the shortest access time as well as an acceptable probability of success. The DEAT algorithm is disclosed in U.S. Pat. No. 6,725,327 incorporated herein by reference.

Apart from RPO considerations, some HDD applications such as, e.g., Redundant Arrays of Independent Disks (RAID) applications use commands each of which involves multiple disk operations. For instance, to generate parity data that can be used in error recovery, XOR commands are used which involve one or more reads, an XOR operation, and one or more writes of the result. In current hard disk drive firmware, XOR commands are typically treated as non-read/write commands and do not take advantage of RPO to reduce disk latencies. That is, the RPO algorithms do not optimize XOR commands in the same advantageous way they optimize data read and data write commands. It may now be understood that as used herein, a "data read" and a "data write" respectively refer to the non-XOR reads and writes conventionally scheduled by RPO algorithms, and not to reads and writes that are only made necessary pursuant to executing XOR commands.

Further, as recognized herein XOR commands typically are not sequentially attached to one another. That is, multiple XOR media-access commands are not coalesced to reduce the number of separate disk accesses if they represent LBA ranges that are sequential. As further understood herein, however, most XOR commands involve 'read-modify-write' type accesses to the command's LBA range which can be better optimized.

Currently, various types of XOR commands are used, all of which can be improved by present principles. As one example, a so-called "XPWrite" command can be used in which the data transferred from the host is XORed with the existing data on the media, and the resulting data is then written to the media. As another example, an "XDWriteRead" operation can be used wherein the data transferred from the host is XORed with data read from the media. The data transferred from the host is then written to the media, while the XORed data is returned to the host.

Regardless of the specific type of XOR command, the present invention is directed to reducing the overall rotational latencies involved in the read and write portions of the XOR command. The present invention critically recognizes that these latencies exist because the three steps of an XOR—read, buffer XOR, and write—are executed in sequence without regard for disk latency. Furthermore, the present invention recognizes that a large amount of latency may exist between the end of the write operation of one XOR command and the start of the read of the next XOR command.

SUMMARY OF THE INVENTION

The present invention splits a coalesced sequential pipe of XOR commands into multiple sets of read, buffer XOR, and write operations to reduce the latency penalty for switching from reading to writing to nearly zero. This is made possible by using head and/or cylinder skew boundaries to seek between reading and writing, and for performing short seeks.

Accordingly, in a first aspect a hard disk drive (HDD) includes at least one rotatable disk and at least one data transfer element. A HDD controller controls the data transfer element to execute XOR commands by coalescing LBA-sequential XOR commands into pipes, and separately executing read commands and write commands in the pipes using skew information.

In non-limiting embodiments the skew information can be cylinder skew information. It can also be head skew information. The XOR commands may be coalesced by a Rotational Position Optimization (RPO) algorithm. A lower level execution engine can determine optimal disk access lengths and optimal read/write switching points based on skew information to minimize dead latency. An XOR disk operation can be terminated on a head or cylinder skew boundary, and a read portion of an XOR command may be terminated on the last skew boundary that allows just enough time to seek back to a starting location of the read portion to begin an XOR write operation that is part of the same XOR command as the read.

In another aspect, a controller executes logic that includes grouping XOR commands in pipes and passing the pipes to an execution engine of a disk drive. The logic also includes separating multiple disk access command reads from corresponding writes and then executing the reads and writes based on skew.

In still another aspect, a HDD includes at least one disk and a controller writing data to and reading data from the disk in response to commands. The controller determines a command to execute by invoking means for grouping LBA-sequential multiple disk access commands, and means for separating reads from writes in the commands. The controller also invokes means for executing the reads and writes based on skew information.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 illustrates a single recording surface (e.g. a drive with one head) with a quarter revolution cylinder skew.

DETAILED DESCRIPTION OF THE PREFERRED EMBODIMENT

Figure 1:
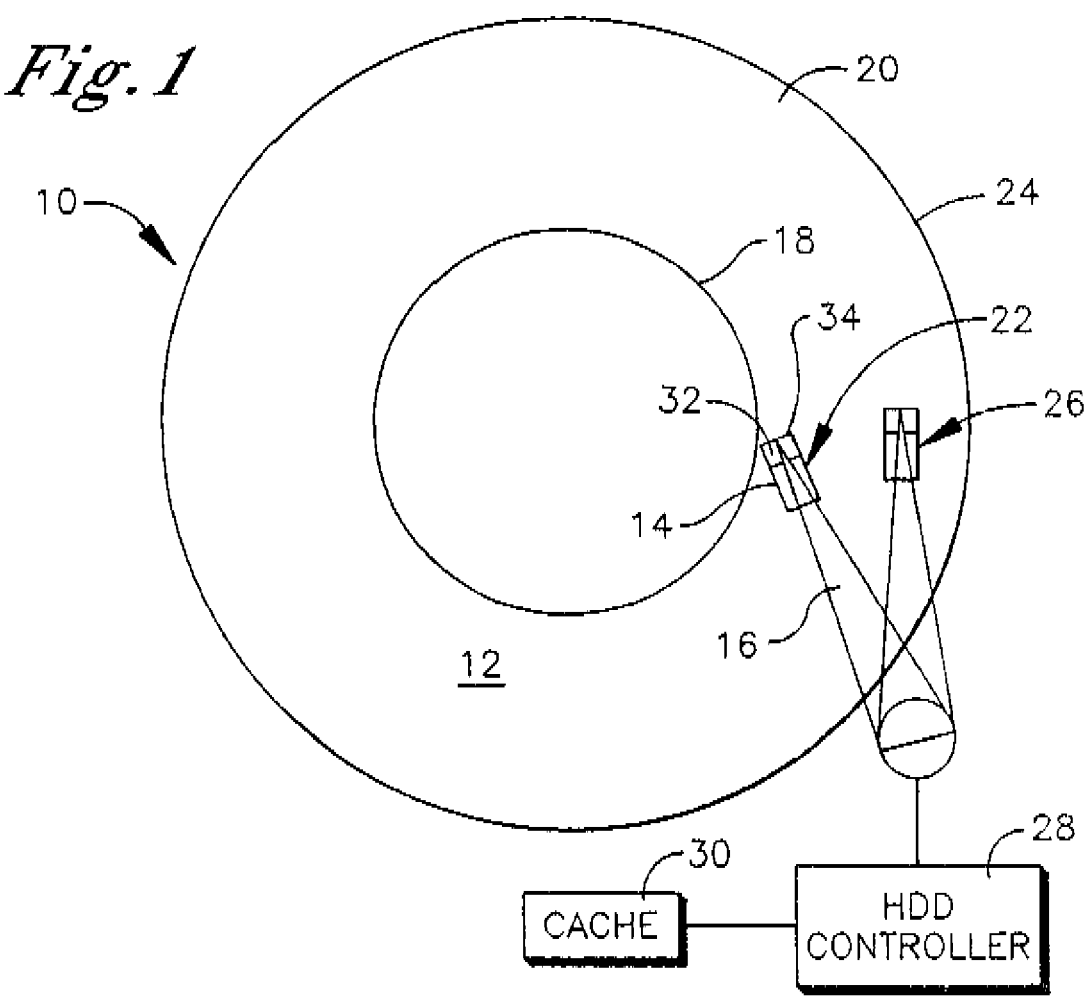
FIG. 1 is a schematic view of the hard disk drive, showing the actuator arm near the inner diameter (ID) and the outer diameter (OD) of the disk.

Referring initially to FIG. 1, a data storage system is shown, generally designated 10, which includes one or more (only one shown for clarity) rotatable hard disks 12 onto which data can be written and from which data can be read by a read/write head 14 that is mounted on an actuator arm 16 for movement of the head 14 over the disk 12 between an inner diameter (ID) 18 of a data storage area 20 of the disk 12 (indicated at position 22 of the head 14) and an outer diameter 24 of the storage area 20 (indicated at position 26 of the head 14). The head 14 and actuator 16 may be controlled by a processor such as a hard disk drive (HDD) controller 28, which executes the below-described logic in accordance with present principles. The controller 28 may be a chip that includes firmware embodying the logic below, which is executed by a processor that can also be on the controller chip or that can be on a separate chip, in which case the controller 28 can be thought of as including both chips. The controller can include logic associated with an RPO algorithm as well as logic associated with a lower-level execution engine of the drive, which receives commands from the RPO to execute. The controller 28 may also access a solid state data cache or buffer 30.

In accordance with HDD principles known in the art and as figuratively shown in FIG. 1, the head 14 may include a write element 32 and a read element 34. The head 14 may be configured for longitudinal recording or for perpendicular recording.

Figure 2:
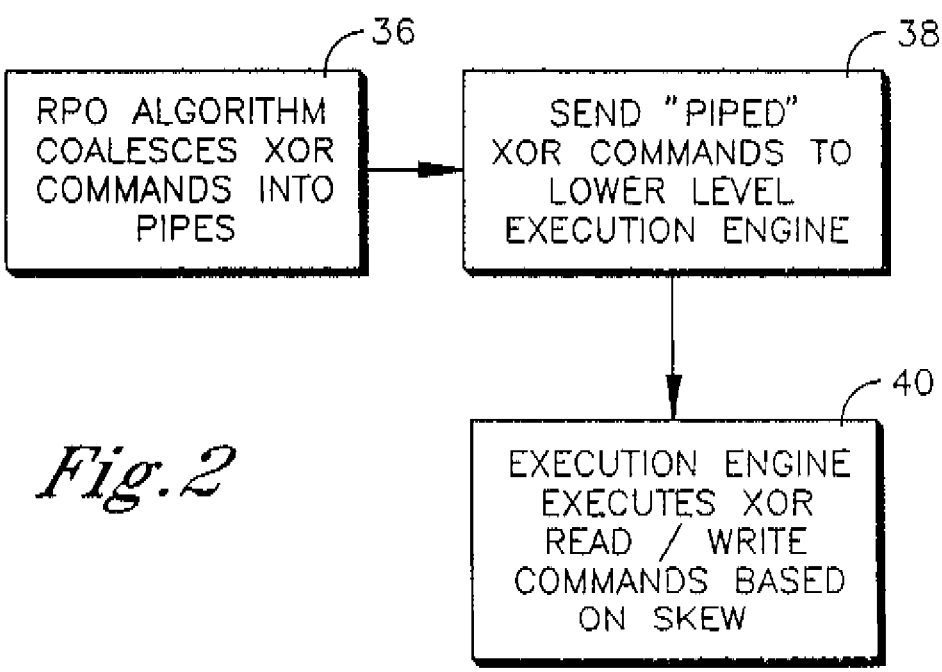
FIG. 2 is a flow chart of the overall logic.

FIG. 2 shows the present logic. Commencing at block 32, XOR commands that are LBA-sequential are coalesced into pipes, preferably by the RPO algorithm, although other logical components can be used such as the queue manager associated with the RPO algorithm. Recognizing, however, that while the coalescing operation of block 36 itself provides a performance boost, it may create separate read and write accesses that are separated by a significant amount of disk latency, because splitting coalesced read and write operations into multiple reads and writes with disk transfer lengths that do not fall on command boundaries heretofore has not been provided for.

It is to be understood that while XOR commands are used as an example, present principles also apply to other multiple disk access commands, i.e., to commands that require one or more reads along with one or more writes.

Accordingly, the logic moves to block 38, wherein the piped XOR commands are provided to the drive's lower level execution engine, which has knowledge of skew parameters of the drive. At block 40 the lower level engine executes read command portions of XOR commands separately from the respective write command portions based on the skew information it possesses.

Thus, in the aspect shown in FIG. 2 disk latencies are not reduced by independently scheduling read and write disk accesses using the RPO algorithm, but rather the separation of XOR reads and writes is accomplished at a lower level to optimally execute a sequential pipe of XOR commands that was selected by RPO. In other words, the drive's queue manager and/or RPO coalesce and select a pipe of XOR commands for execution which are then executed in the fewest amount of revolutions possible at the lower level execution engine to reduce overall command execution times, which is possible because the execution engine can efficiently break up disk accesses on non-command boundaries.

The logic of the execution engine thus determines, at block 40, the optimal disk access lengths and the optimal read/write switching points, which involves the calculation of the optimal disk access lengths measured in sectors, typically the same unit as skew is measured in. Essentially, the invention determines the optimal point to switch from a read access to the corresponding write access without incurring unnecessary rotational latency.

The process at block 40 can be better understood in reference to FIG. 3 and the following discussion. Optimal disk access lengths are calculated to minimize read latency. As recognized herein, the optimal location, although not the only location, for terminating an XOR disk operation is on a head or cylinder skew boundary. This allows for time to switch from the write of one operation to the read of the next operation without missing a revolution. The optimal location to terminate the read portion of an XOR command is on the last skew boundary that allows just enough time to seek back to the starting location to begin the write operation without incurring unnecessary latency.

Looking at FIG. 3, an optimized disk access starts with a read operation at the location labeled "Start of Disk Op1". Disk Op1 can be an XOR command consisting of a read, a write, and a buffer XOR operation. Assume clockwise processing.

The read operation reads the outermost track (track 0) for a complete revolution, then switches to and reads all of tracks 1, 2 and 3. Specifically, after reading track 0, as indicated by the bolded arc 42, which represents the length of the cylinder skew (in the example shown, a quarter revolution), the disk seeks to track 1 during the time the arc 42 passes beneath the head, at which point track 1 is read for a complete revolution. Then, as indicated by the arc 44, the disk seeks to track 2 during the time the arc 44 passes beneath the head, at which point track 2 is read for a complete revolution, and so on.

As indicated by the double arrow 46, at the end of reading track 3, a seek operation can move the actuator back to Track 0 to start the XOR write operation corresponding to the just-described XOR read operation. The write operation then proceeds on tracks 0, 1, 2 and 3. At the end of the write operation, the head switches from writing to reading under the cylinder skew while switching to track 4. This represents the start of the next disk operation, labeled "Start of Op2", which can be a second XOR command or a continuation of the same command operated on with Op1, it being understood that Op1 and Op2 can be commands but are not constrained to be commands.

Or, as the double arrow 46 indicates, depending on the skew the write portion of Disk Op1 might not be executed immediately after the read portion. Instead, a read portion of Disk Op 2 might be started on track 4, if latency advantage can be had, with the write portion of Disk Op 1 being executed afterwards.

In other words, while FIG. 3 shows the disk operations meeting at command boundaries, it is to be understood that this is not necessary. For example, as just mentioned if two disk operations do not start and end at command boundaries, one might be partially completed, then the second be partially or totally completed, and then the first be reverted to for completion.

It should be understood that the above disclosure assumes that the drive can switch from reading to writing in less than one skew time. This occurs under the seek when switching from reading to writing, and also at then end of the write operation, where the next XOR disk access starts its read operation. Also, it assumes that the seek from the end of the read to the start of the write can be performed in less than one skew time. Furthermore, for ease of exposition the above discussion assumes only cylinder skews in a single disk. As the skilled artisan will appreciate, however, drives with more recording surfaces and heads, which employ head skews, can use the head skews in the same way as the cylinder skews discussed herein. Moreover, it is assumed that the cache segments used for the disk operations are large enough to support the optimal disk access lengths, which is reasonable because current hard drives typically employ a variable buffer segmentation strategy which could be used to efficiently allocate enough buffer segment space.

While the particular SYSTEM AND METHOD FOR OPTIMIZING SEQUENTIAL XOR COMMAND PERFORMANCE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

We claim:

1. A hard disk drive (HDD) comprising:
   at least one rotatable disk;
   at least one data transfer element; and
   at least one controller controlling the data transfer element to execute XOR commands by coalescing LBA-sequential XOR commands into pipes, and separately executing read commands and write commands in the pipes using skew information, each XOR command including at least one read followed by an XOR operation followed by at least one write of the result of the XOR operation, wherein optimal disk access lengths and optimal read/write switching points are determined based on skew information to minimize dead latency, and further wherein a read portion of an XOR command is terminated on a last skew boundary that allows just enough time to seek back to a starting location of the read portion to begin an XOR write operation without incurring an additional disk revolution.

2. The HDD of claim 1, wherein the skew information is cylinder skew information.

3. The HDD of claim 1, wherein the XOR commands are coalesced by a Rotational Position Optimization (RPO) algorithm.

4. The HDD of claim 1, wherein an XOR disk operation is terminated on a head or cylinder skew boundary.

5. A controller executing logic comprising:
   grouping multiple disk access commands in pipes, each command requiring at least one read along with at least one associated write;
   passing the pipes to an execution engine of a disk drive;
   separating multiple disk access command reads from corresponding writes and then executing the reads and writes based on skew, wherein optimal disk access lengths and optimal read/write switching points are determined based on skew to minimize dead latency, and further wherein a read portion of a command is terminated on a last skew boundary that allows just enough time to seek back to a starting location of the read portion to begin a related write operation.

6. The controller of claim 5, wherein the skew is cylinder skew.

7. The controller of claim 5, wherein the commands are coalesced by a Rotational Position Optimization (RPO)) algorithm.

8. The controller of claim 5, wherein a disk operation is terminated on a head or cylinder skew boundary.

9. A HDD comprising:
   at least one disk;
   a controller writing data to and reading data from the disk in response to commands, each command requiring at least one read along with at least one associated write, the controller invoking:
   means for grouping LBA-sequential multiple disk access commands;
   means for separating reads from writes in the commands; and
   means for executing the reads and writes based on skew information, wherein optimal disk access lenghts and optimal read/write switching points are determined by the means for executing based on skew information to minimize dead latency, and wherein the means for executing terminates a read portion of an XOR command on a last skew boundary that allows just enough time to seek back to a starting location of the read portion to begin an XOR write operation without incurring an additional disk revolution.

10. The HDD of claim 9, wherein the means for grouping is embodied in an RPO algorithm.

11. The HDD of claim 10, wherein the means for separating and means for executing are embodied in an execution engine that is at a lower level in a software architecture of the HDD than the RPO algorithm.

12. The HDD of claim 9, wherein the skew information is cylinder skew information.

13. The HDD of claim 9, wherein the means for executing terminates an XOR disk operation on a head or cylinder skew boundary.

* * * * *